United States Patent
Nakagawa et al.

(10) Patent No.: US 7,028,085 B2
(45) Date of Patent: Apr. 11, 2006

(54) STORAGE-RELATED ACCOUNTING SYSTEM AND METHOD OF THE SAME

(75) Inventors: Yoshihito Nakagawa, Tokyo (JP); Shizuo Yokohata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 604 days.

(21) Appl. No.: 09/915,692

(22) Filed: Jul. 25, 2001

(65) Prior Publication Data
US 2002/0107956 A1 Aug. 8, 2002

(30) Foreign Application Priority Data
Feb. 8, 2001 (JP) ............................. 2001-031707

(51) Int. Cl.
*G06F 15/173* (2006.01)
(52) U.S. Cl. ...................... 709/224; 215/216; 215/217; 215/225; 705/52; 705/400
(58) Field of Classification Search ................ 709/223, 709/224–225, 203, 213–217, 219; 705/52, 705/400
See application file for complete search history.

(56) References Cited

U.S. PATENT DOCUMENTS

| | | | |
|---|---|---|---|
| 5,754,787 A | * | 5/1998 | Dedrick ....................... 709/228 |
| 5,768,521 A | * | 6/1998 | Dedrick ....................... 709/224 |
| 5,946,670 A | * | 8/1999 | Motohashi et al. ......... 705/400 |
| 5,982,754 A | * | 11/1999 | Itou et al. .................... 370/253 |
| 6,000,034 A | * | 12/1999 | Lightbody et al. ............ 726/21 |
| 6,016,509 A | * | 1/2000 | Dedrick ....................... 709/224 |
| 6,088,737 A | * | 7/2000 | Yano et al. .................. 709/235 |
| 6,119,160 A | | 9/2000 | Zhang et al. |
| 6,434,746 B1 | * | 8/2002 | Nagashima et al. ........... 725/5 |
| 6,711,649 B1 | * | 3/2004 | Bachmat et al. ............ 711/114 |

FOREIGN PATENT DOCUMENTS

| | | |
|---|---|---|
| JP | 2000-049774 | 2/2000 |
| WO | WO97/22936 A | 6/1997 |
| WO | WO 9722936 | * 6/1997 |

* cited by examiner

*Primary Examiner*—Saleh Najjar
*Assistant Examiner*—Oanh Duong
(74) *Attorney, Agent, or Firm*—Townsend and Townsend and Crew LLP

(57) ABSTRACT

An accounting system includes a plurality of host computers, an accounting server connected to the plurality of host computers, a storage control device connected to the plurality of host computers and the accounting server and having a plurality of channel ports for performing data input/output operation, storage devices connected to the storage control device for storing data inputted/outputted to/from the plurality of host computers, an accounting data generating unit for generating accounting data containing at least one of number of times of access and a data transfer quantity for every accounting subject control unit, and a transfer unit for informing the accounting server of the accounting data generated by the accounting data generating unit, executing the accounting process for the plurality of accounting subject control units.

25 Claims, 15 Drawing Sheets

FIG.3

WWN ACCOUNTING INFORMATION TABLE (614, SHARED MEMORY 605)

105 WWN

| | |
|---|---|
| 615 | ACCESS NUMBER-OF-TIME INTEGRATED VALUE [NUMBER OF TIMES] |
| 616 | DATA TRANSFER-QUANTITY INTEGRATED VALUE [MBYTE] |
| 617 | ACCESS NUMBER-OF-TIME UPPER LIMIT VALUE [NUMBER OF TIMES/SEC] |
| 618 | DATA TRANSFER-QUANTITY UPPER LIMIT VALUE [MBYTE/SEC] |
| 619 | ACCESS NUMBER-OF-TIME UPPER LIMIT VALUE FOR SUPERVISING UPPER LIMIT VALUE [NUMBER OF TIMES] |
| 620 | DATA TRANSFER-QUANTITY UPPER LIMIT VALUE FOR SUPERVISING UPPER LIMIT VALUE [MBYTE] |
| 621 | UPPER LIMIT VALUE SUPERVISING START TIME |

106 WWN

- ACCESS NUMBER-OF-TIME INTEGRATED VALUE [NUMBER OF TIMES]
- DATA TRANSFER-QUANTITY INTEGRATED VALUE [MBYTE]
- ACCESS NUMBER-OF-TIME UPPER LIMIT VALUE [NUMBER OF TIMES/SEC]
- DATA TRANSFER-QUANTITY UPPER LIMIT VALUE [MBYTE/SEC]
- ACCESS NUMBER-OF-TIME UPPER LIMIT VALUE FOR SUPERVISING UPPER LIMIT VALUE [NUMBER OF TIMES]
- DATA TRANSFER-QUANTITY UPPER LIMIT VALUE FOR SUPERVISING UPPER LIMIT VALUE [MBYTE]
- UPPER LIMIT VALUE SUPERVISING START TIME

⋮

STORAGE-RELATED ACCOUNTING SYSTEM AND METHOD OF THE SAME

BACKGROUND OF THE INVENTION

The present invention relates to an accounting system in which accounting can be made on the basis of number of times of access and a data transfer quantity with respect to a storage control device, and relates to an accounting method.

As an accounting method to be used in the case of provision of a storage, there is a fixed accounting method in which a fixed accounting amount is determined for each user in accordance with storage capacity assigned to the user.

As this fixed accounting method, there is provided a method in which fixed accounting with respect to assigned storage capacity is made so that the same account rate is charged to each user assigned to have an equal capacity storage, even though number of times of access or data transfer quantities among the users are different.

SUMMARY OF THE INVENTION

An object of the present invention is to provide an accounting system and an accounting method in which an access number-of-time upper limit value and a data transfer-quantity upper limit value for every connected channel port, every connected server, every connected World Wide Name (WWN), or every storage device are set so that the number of times of access and the data transfer quantity can be limited to be not larger than the respective upper limit values, or so that accounting of number of times of access and a data transfer quantity larger than the respective upper limit values can be made.

That is, the storage-related accounting method according to the present invention has an aspect that not only can fixed accounting with respect to assigned storage capacity be made, but also accounting in accordance with number of times of access and a data transfer quantity of every connected server, number of times of access and a data transfer quantity of every connected World Wide Name (WWN), number of times of access and a data transfer quantity of every connected channel port, number of times of access and a data transfer quantity of every connected storage device, or number of times of access and a data transfer quantity of every connected in-storage-device area can be made.

According to the present invention, meter accounting can be realized by having accounting data required for calculation of an account amount for every server, every World Wide Name (WWN), every channel port, every storage device, and every storage area in every storage device; by making a storage control device provided with means of measuring the number of times of access and data transfer quantities; by recording the measured data as accounting data in the storage control device; and by making accounting in accordance with the recorded accounting data.

Further, meter accounting can be realized by setting an access number-of-time upper limit value and a data transfer-quantity upper limit value for every server, every World Wide Name (WWN), every channel port, every storage device, and every storage area in every storage device; by making a storage control device provided with means of limiting the number of times of access and data transfer quantities to be not larger than the upper limit values; and by making accounting in accordance with the number of times of access and data transfer quantities larger than the upper limit values.

Further, accounting service can be performed by making the storage control device have means of informing the accounting server or the service processor connected to the storage control device of the accounting data stored in the storage control device.

BRIEF DESCRIPTION OF THE DRAWINGS

FIG. 3 is a table for managing number of times of access and a data transfer quantity of every World Wide Name in the embodiment;

DETAILED DESCRIPTION OF THE EMBODIMENTS

The present invention will be described below with reference to the drawings.

Figure 1:
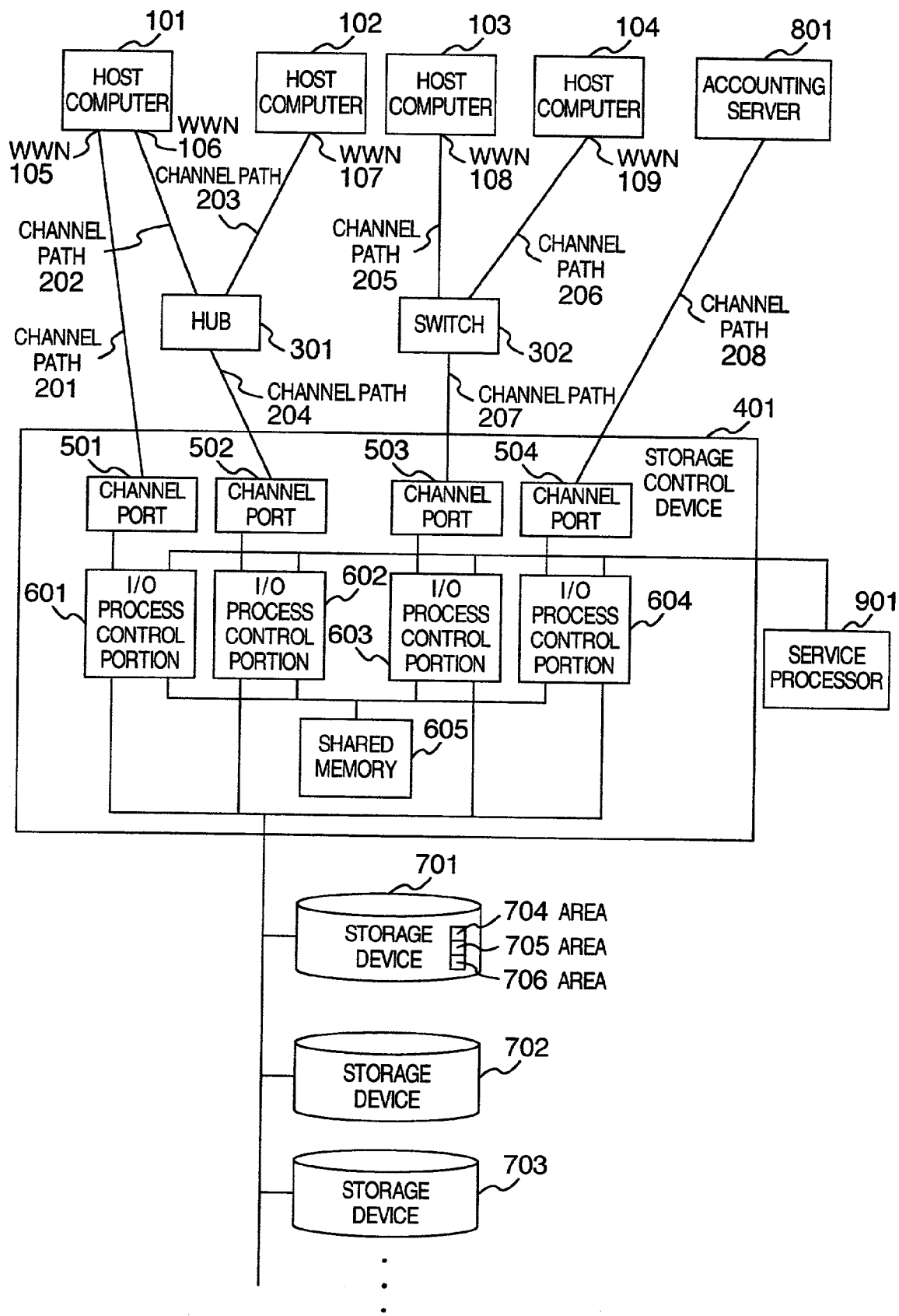
FIG. 1 is a diagram of the configuration of an accounting system according to an embodiment of the present invention.

FIG. 1 is a diagram showing an embodiment of a storage-related accounting system according to the present invention. In the storage-related accounting system of FIG. 1, a WWN 105 of a host computer 101, a WWN 106 of the same host computer 101, a WWN 107 of a host computer 102, a WWN 108 of a host computer 103, a WWN 109 of a host computer 104, and an accounting server 801 are connected to channel ports 501 to 504 of a storage control device 401 through a channel path 201, through a channel path 202, a HUB 301 and a channel path 204, through a channel path 203, the HUB 301 and the channel path 204, through a channel path 205, a SWITCH 302 and a channel path 207, through a channel path 206, the SWITCH 302 and the channel path 207, and through a channel path 208, respectively. Incidentally, the storage control device 401 and the host computers 101 to 104 are connected through serial channels, for example, of optical fibers so as to constitute a LAN.

The storage control device 401 is constituted by the channel ports 501 to 504, I/O process control portions 601 to 604 and a shared memory 605. The I/O process control portions 601 to 604 control the I/O process which is requested to areas 704, 705, 706 . . . of a plurality of storage devices 701, 702, 703 . . . from the host computers 101 to 104. The I/O process control portions 601 to 604 can make access to the shared memory 605.

The I/O process control portions 601 to 604 perform data I/O operation to/from the plurality of storage devices 701 to 703.

A service processor 901 is connected to each of the I/O process control portions 601 to 604.

FIGS. 2 to 6 are accounting information tables provided in the shared memory 605.

Each of the accounting information tables holds, as accounting data, the number of times of access and the data transfer quantity for every control unit which will be the accounting subject. Specifically, the control unit may include the connection-end host computer, the World Wide Name (WWN), the storage-end storage device, the storage area in the storage device, and so on.

Figure 2:
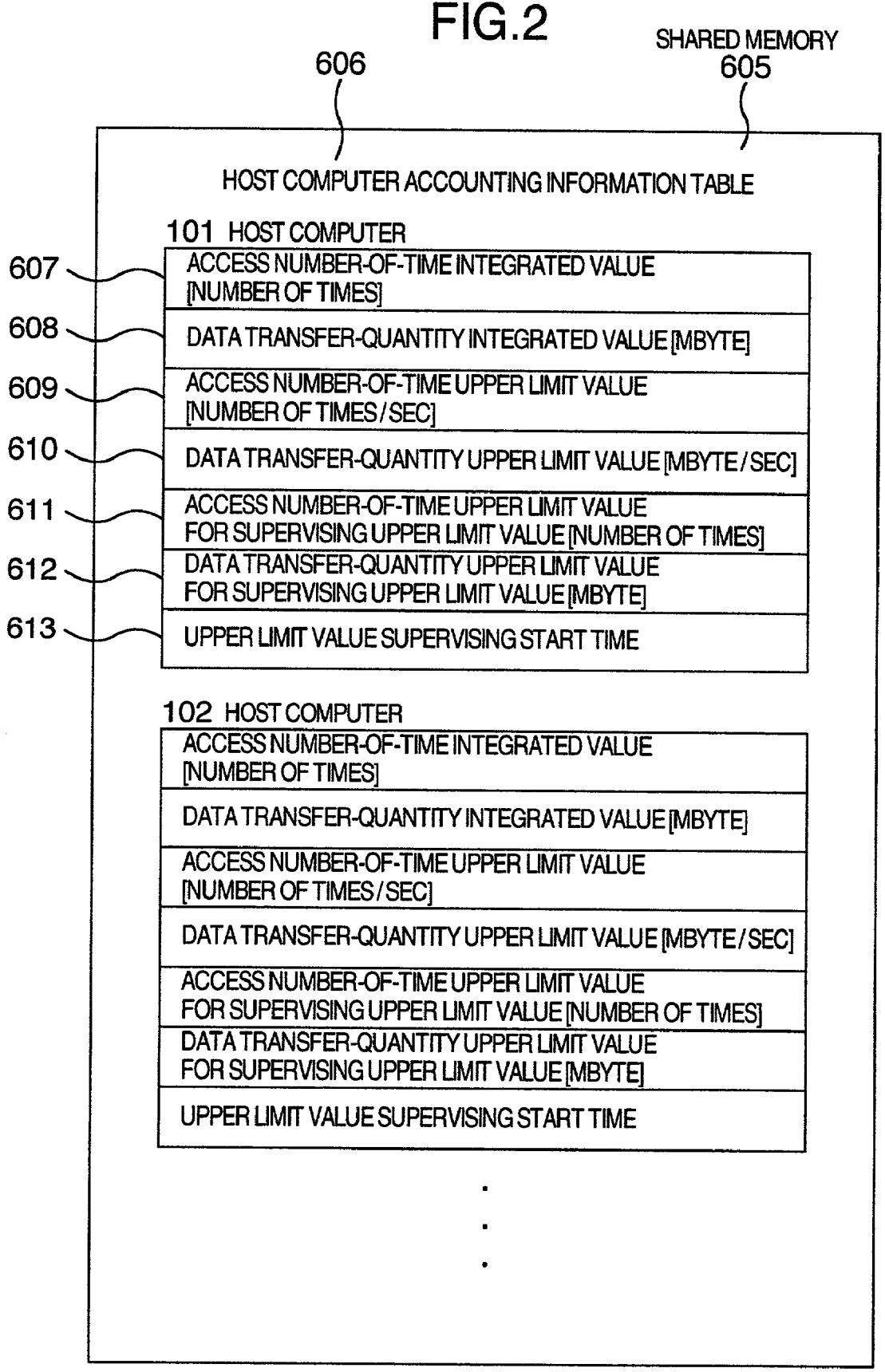
FIG. 2 is a table for managing number of times of access and a data transfer quantity of every host computer in the embodiment.

When the number of times of access and a data transfer quantity are accounted for every host computer, the host computer accounting information table 606 shown in FIG. 2 is updated by the I/O process control portions 601 to 604 so that the accounting data is generated for every host computer. An access number-of-time integrated value 607 is a value obtained by integrating the number of times of access from the host computer 101. A data transfer-quantity integrated value 608 is a value obtained by integrating the data transfer quantity given from the host computer 101. An access number-of-time upper limit value 609 is number of times of access given from the host computer 101 and allowed to be processed in one second. A data transfer-quantity upper limit value 610 is a data transfer quantity given from the host computer 101 and allowed to be processed in one second. An access number-of-time upper limit value 611 for supervising the upper limit value is an integrated value obtained by integrating the number of times of access given from the host computer 101 in one second. A data transfer-quantity upper limit value 612 for supervising the upper limit value is an integrated value obtained by integrating the data transfer quantity given from the host computer 101 in one second. An upper limit value supervising start time 613 is a time when the number of times of access or the data transfer quantity given from the host computer 101 in one second starts to be measured. The host computer 102 also has the same table as the host computer 101, and each of the host computers 103 and 104 has the same table, too.

When the number of times of access and the data transfer quantity are accounted for every WWN, a WWN accounting information table 614 shown in FIG. 3 is updated by the I/O process control portions 601 to 604 so that the accounting data for every WWN is generated. An access number-of-time integrated value 615 is a value obtained by integrating the number of times of access given from the WWN 105. A data transfer-quantity integrated value 616 is a value obtained by integrating the data transfer quantity given from the WWN 105. An access number-of-time upper limit value 617 is the number of times of access given from the WWN 105 and allowed to be processed in one second. A data transfer-quantity upper limit value 618 is a data transfer quantity given from the WWN 105 and allowed to be processed in one second. An access number-of-time upper limit value 619 for supervising the upper limit value is an integrated value obtained by integrating the number of times of access given from the WWN 105 in one second. A data transfer-quantity upper limit value 620 for supervising the upper limit value is an integrated value obtained by integrating the data transfer quantity given from the WWN 105 in one second. An upper limit value supervising start time 621 is a time when the number of times of access or data transfer quantity given from the WWN 105 in one second starts to be measured. The WWN 106 also has the same table as the WWN 105, and each of the WWNs 107 to 109 has the same table, too.

Figure 4:
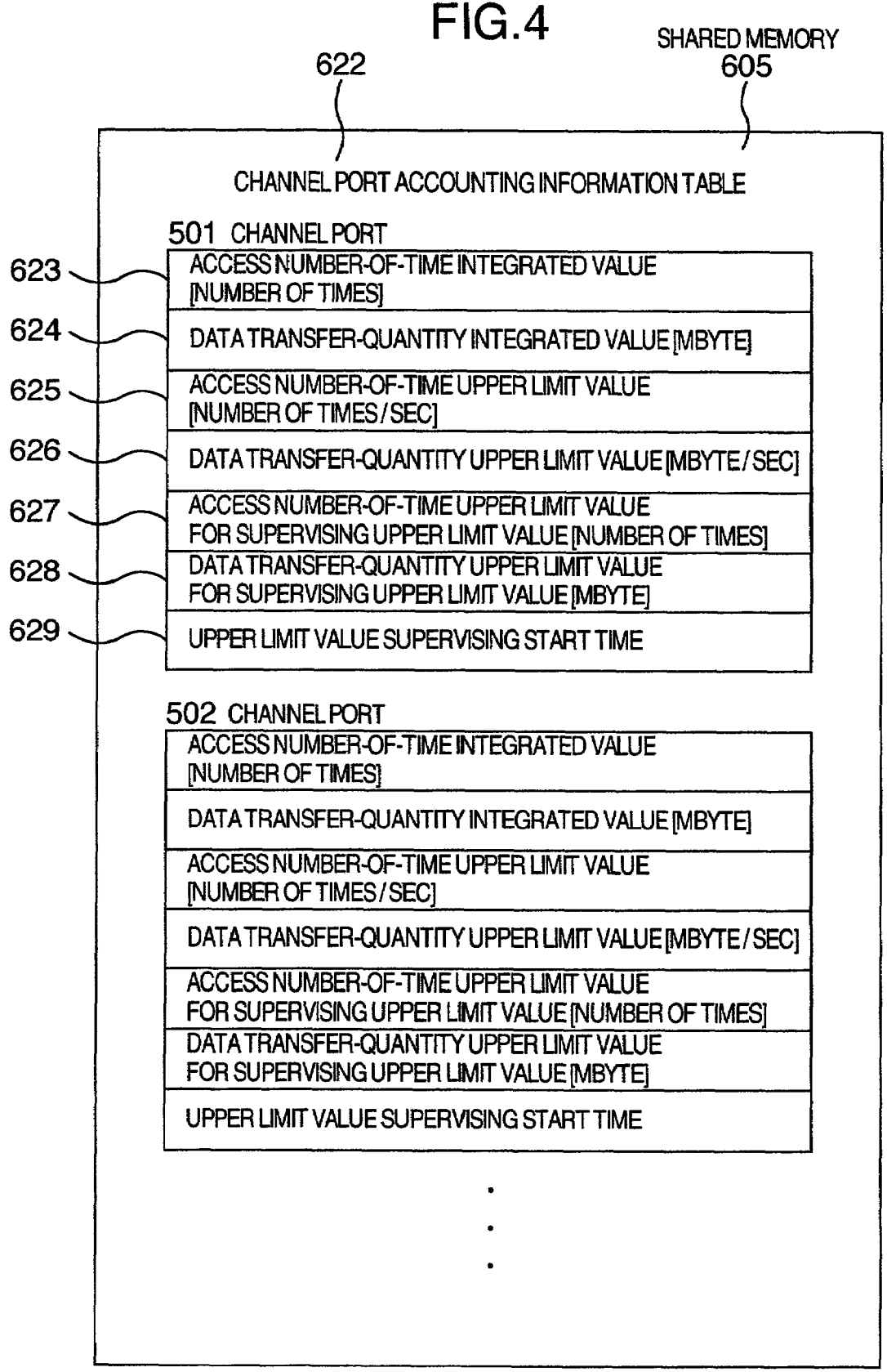
FIG. 4 is a table for managing number of times of access and a data transfer quantity of every channel port in the embodiment.

When the number of times of access and the data transfer quantity are accounted for every channel port, a channel port accounting information table 622 shown in FIG. 4 is updated by the I/O process control portions 601 to 604 so that the accounting data for every channel port is generated.

An access number-of-time integrated value 623 is a value obtained by integrating the number of times of access given through the channel port 501. A data transfer-quantity integrated value 624 is a value obtained by integrating the data transfer quantity given through the channel port 501. An access number-of-time upper limit value 625 is the number of times of access given through the channel port 501 and allowed to be processed in one second. A data transfer-quantity upper limit value 626 is a data transfer quantity given through the channel port 501 and allowed to be processed in one second. An access number-of-time upper limit value 627 for supervising the upper limit value is an integrated value obtained by integrating the number of times of access given through the channel port 501 in one second. A data transfer-quantity upper limit value 628 for supervising the upper limit value is an integrated value obtained by integrating the data transfer quantity given through the channel port 501 in one second. An upper limit value supervising start time 629 is a time when the number of times of access or data transfer quantity given through the channel port 501 in one second starts to be measured. The channel port 502 also has the same table as the channel port 501, and each of the channel ports 503 and 504 has the same table, too.

Figure 5:
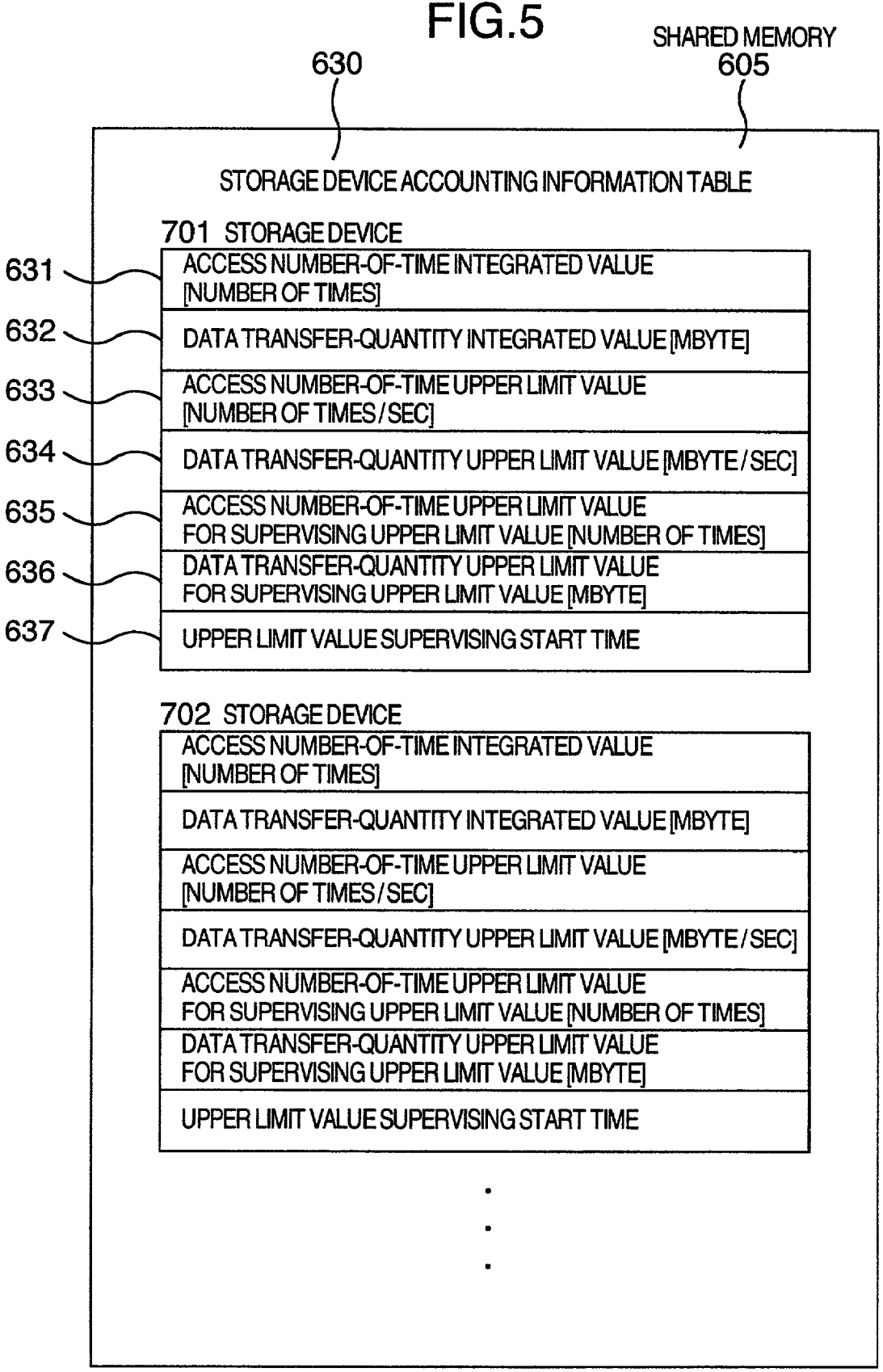
FIG. 5 is a table for managing number of times of access and a data transfer quantity of every storage device in the embodiment.

When the number of times of access and the data transfer quantity are accounted for every storage device, a storage device accounting information table 630 shown in FIG. 5 is updated by the I/O process control portions 601 to 604 so that accounting data for every storage device is generated.

An access number-of-time integrated value 631 is a value obtained by integrating the number of times of access to the storage device 701. A data transfer-quantity integrated value 632 is a value obtained by integrating the data transfer quantity given to the storage device 701. An access number-of-time upper limit value 633 is the number of times of access given to the storage device 701 and allowed to be processed in one second. A data transfer-quantity upper limit value 634 is a data transfer quantity given to the storage device 701 and allowed to be processed in one second. An access number-of-time upper limit value 635 for supervising the upper limit value is an integrated value obtained by integrating the number of times of access given to the storage device 701 in one second. A data transfer-quantity upper limit value 636 for supervising the upper limit value is an integrated value obtained by integrating the data transfer quantity given to the storage device 701 in one second. An upper limit value supervising start time 637 is a time when the number of times of access or data transfer quantity given to the storage device 701 in one second starts to be measured. The storage device 702 also has the same table as the storage device 701, and the storage device 703 et seq. has the same table, too.

Figure 6:
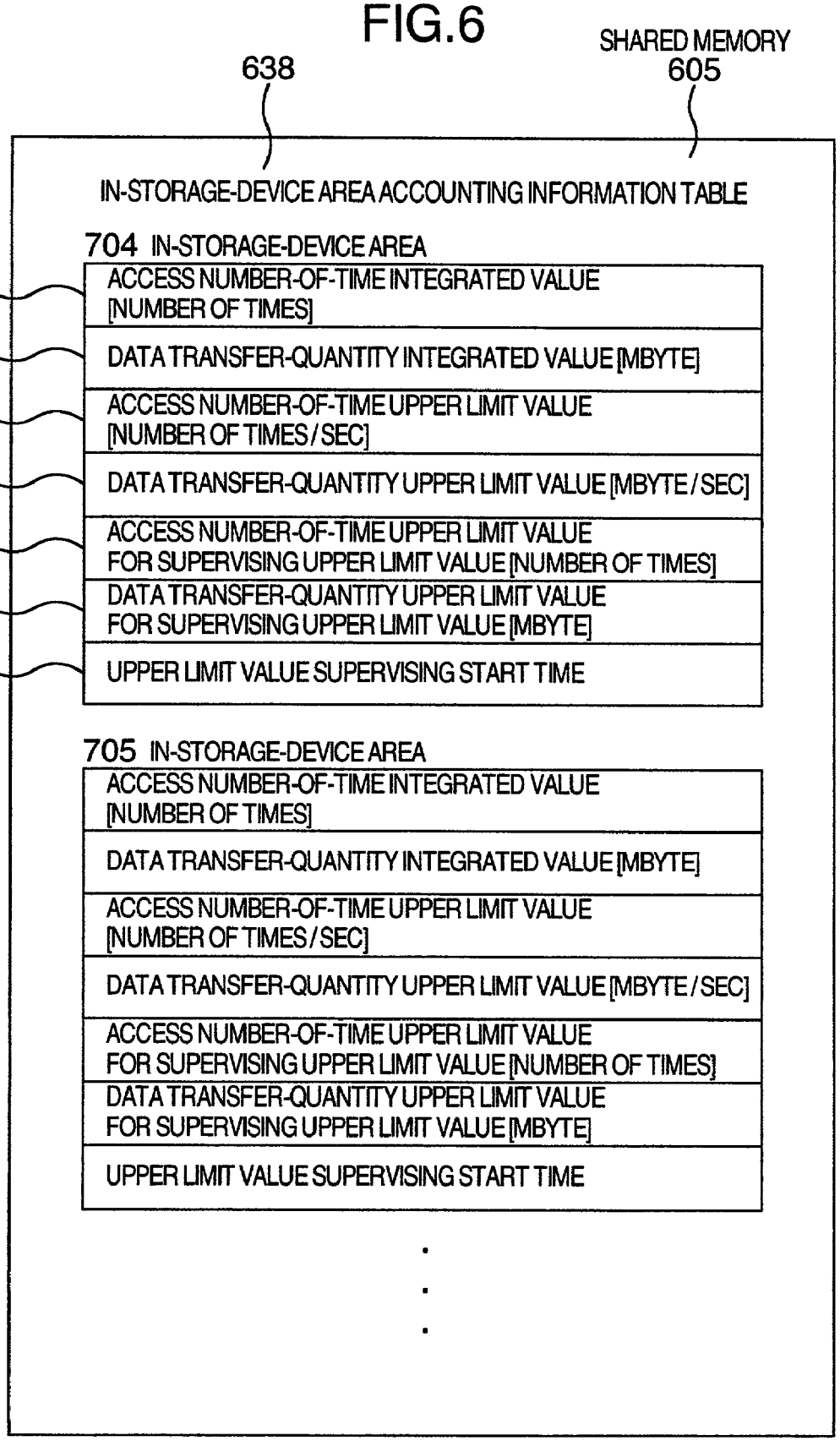
FIG. 6 is a table for managing number of times of access and a data transfer quantity of each storage area in each storage device in the embodiment.

When the number of times of access and the data transfer quantity are accounted for every area in every storage device, an in-storage-device area accounting information table 638 shown in FIG. 6 is updated by the I/O process control portions 601 to 604 so that accounting data is generated for every in-storage-device area.

An access number-of-time integrated value 639 is a value obtained by integrating the number of times of access to the in-storage-device area 704. A data transfer-quantity integrated value 640 is a value obtained by integrating the data transfer quantity given to the in-storage-device area 704. An access number-of-time upper limit value 641 is the number of times of access given to the in-storage-device area 704 and allowed to be processed in one second. A data transfer-quantity upper limit value 642 is a data transfer quantity given to the in-storage-device area 704 and allowed to be processed in one second. An access number-of-time upper limit value 643 for supervising the upper limit value is an integrated value obtained by integrating the number of times of access given to the in-storage-device area 704 in one second. A data transfer-quantity upper limit value 644 for supervising the upper limit value is an integrated value obtained by integrating the data transfer quantity given to the in-storage-device area 704 in one second. An upper limit value supervising start time 645 is a time when the number of times of access or the data transfer quantity given to the in-storage-device area 704 in one second starts to be measured. The in-storage-device area 706 also has the same table as the in-storage-device area 704

Figure 7:
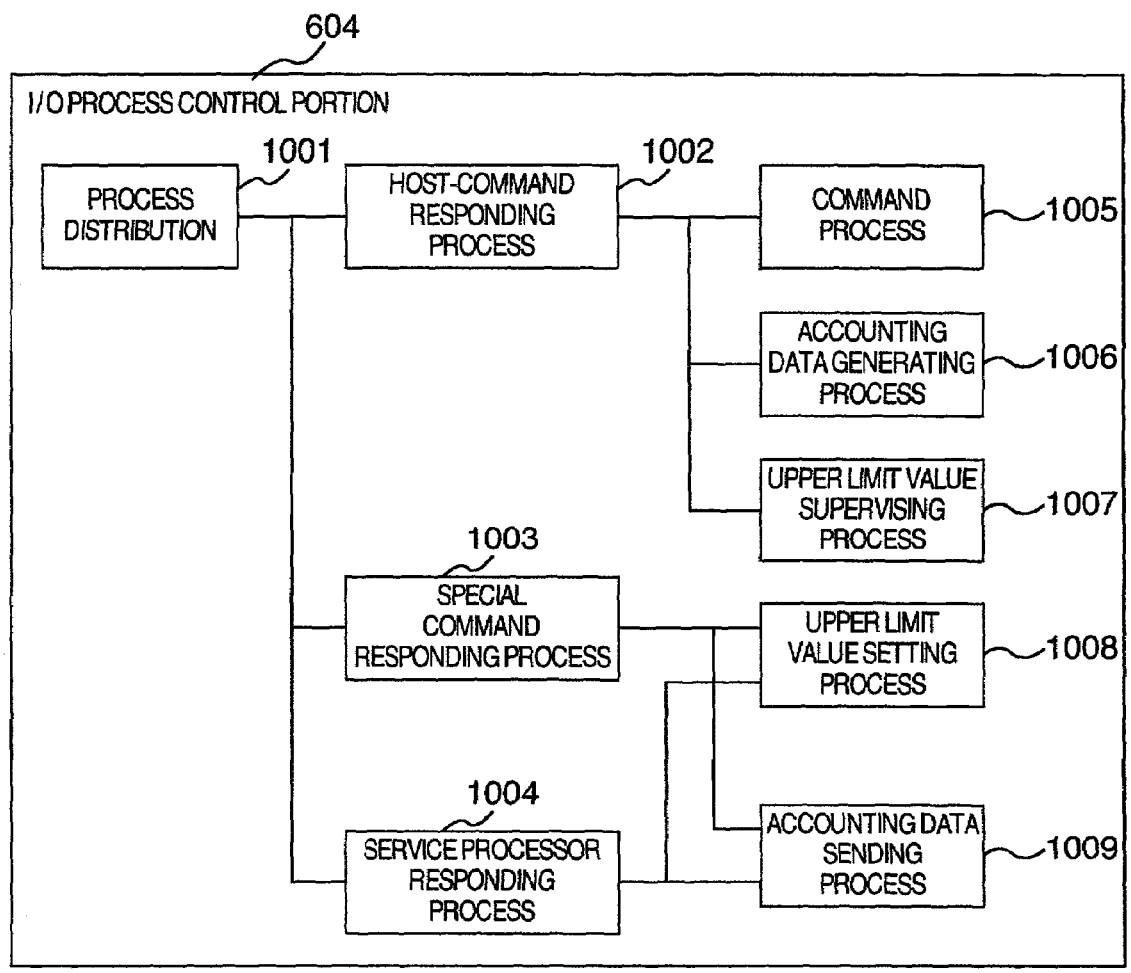
FIG. 7 is a diagram of the configuration of an I/O process control portion.

FIG. 7 is a diagram showing a process configuration of each of the I/O process control portions 601 to 604 by a computer program. In process distribution (Step 1001), a host-command responding process (Step 1002), a special command responding process (Step 1003) or a service processor responding process (Step 1004) in response to the request contents to the I/O process control portions 601 to 604 are executed.

The host-command responding process (Step 1002) is constituted by a command process (Step 1005), an accounting data generating process (Step 1006), and an upper limit value supervising process (Step 1007). In the command process (Step 1005), a process from the host computers 101 to 104 is executed. In the accounting data generating process (Step 1006), accounting data is generated in accordance with access or data transfer made in the command process (Step 1005). In the upper limit value supervising process (Step 1007), access and data transfer are supervised and limited so as to be not larger than a predetermined access number-of-time upper limit value and a predetermined data transfer-quantity upper limit value, respectively.

The special command responding process (Step 1003) is constituted by an upper limit value setting process (Step 1008) and an accounting data transmitting process (Step 1009). In the upper limit value setting process (Step 1008), in response to the request from the accounting server 801 for setting of the access number-of-time upper limit values and the data transfer-quantity upper limit values, the access number-of-time upper limit values and the data transfer-quantity upper limit values are set respectively for the host computer accounting information table 606, the WWN accounting information table 614, the channel port accounting information table 622, the storage device accounting information table 630 and the in-storage-device area accounting information table 638, which are all stored in the shared memory 605. On the other hand, in the accounting data transmitting process (Step 1009), in response to the request from the accounting server 801 for sending accounting data, the access number-of-time integrated values and the data transfer-quantity integrated values respectively for the accounting information tables 606, 614, 622, 630 and 638, which are all stored in the shared memory 605 are sent to the accounting server 801.

Figure 8:
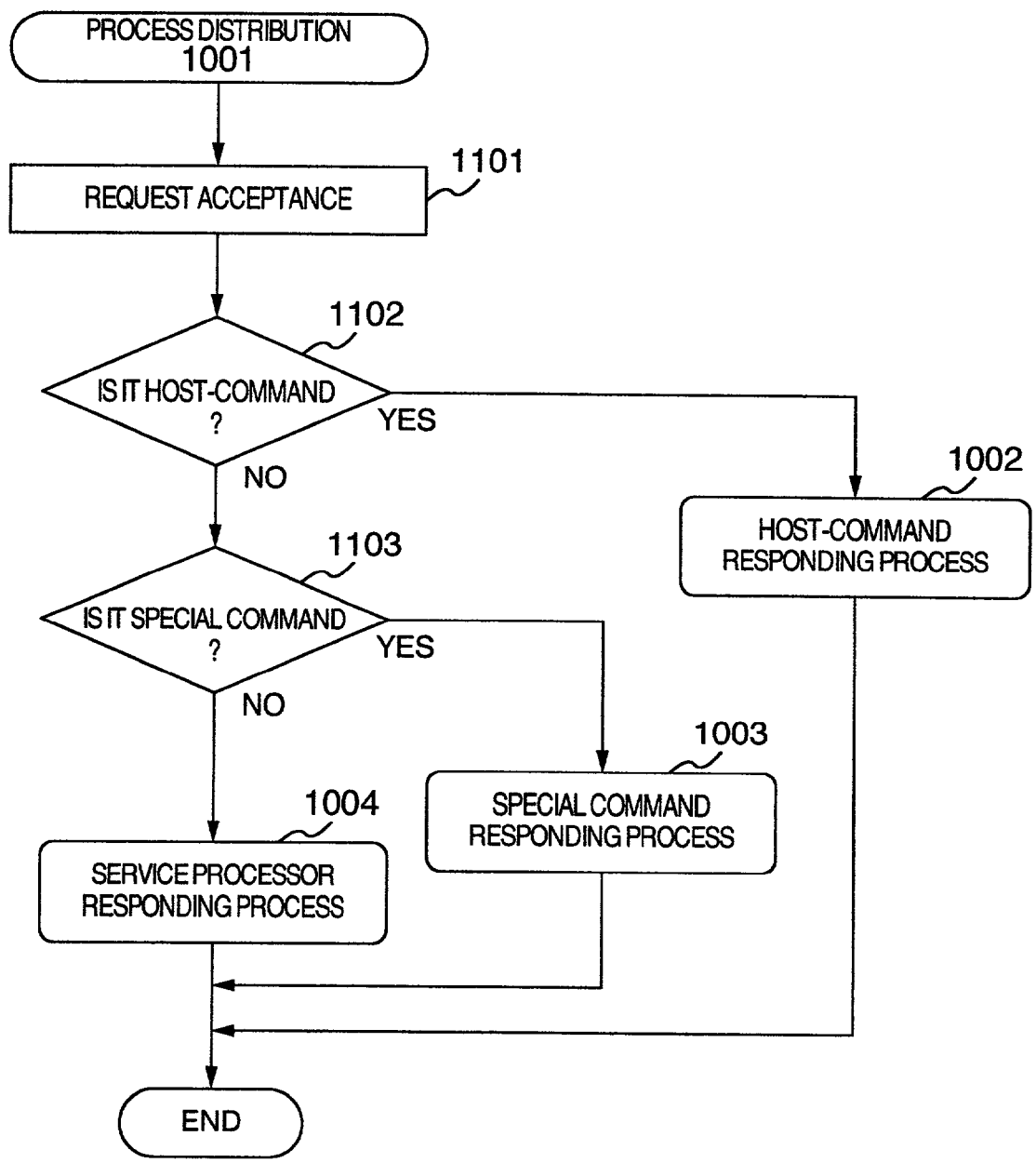
FIG. 8 is a flow chart of process distribution in response to a request issued to the I/O process control portion.

FIG. 8 is a chart showing a flow of the process distribution (Step 1001) in the I/O process control portion 604. In the flow of FIG. 8, in the process distribution (Step 1001), a request is accepted (Step 1101), and then a host-command responding process (Step 1002) shown in FIG. 7 is executed when the accepted request is a host command from one of the host computers 101 to 104 (Step 1102), or a special command responding process (Step 1003) is executed when the accepted request is a special command (Step 1103) from the accounting server 801, or a service processor responding process (Step 1004) shown in FIG. 7 is executed when the accepted request is a request from the service processor (Step 1004).

Figure 9:
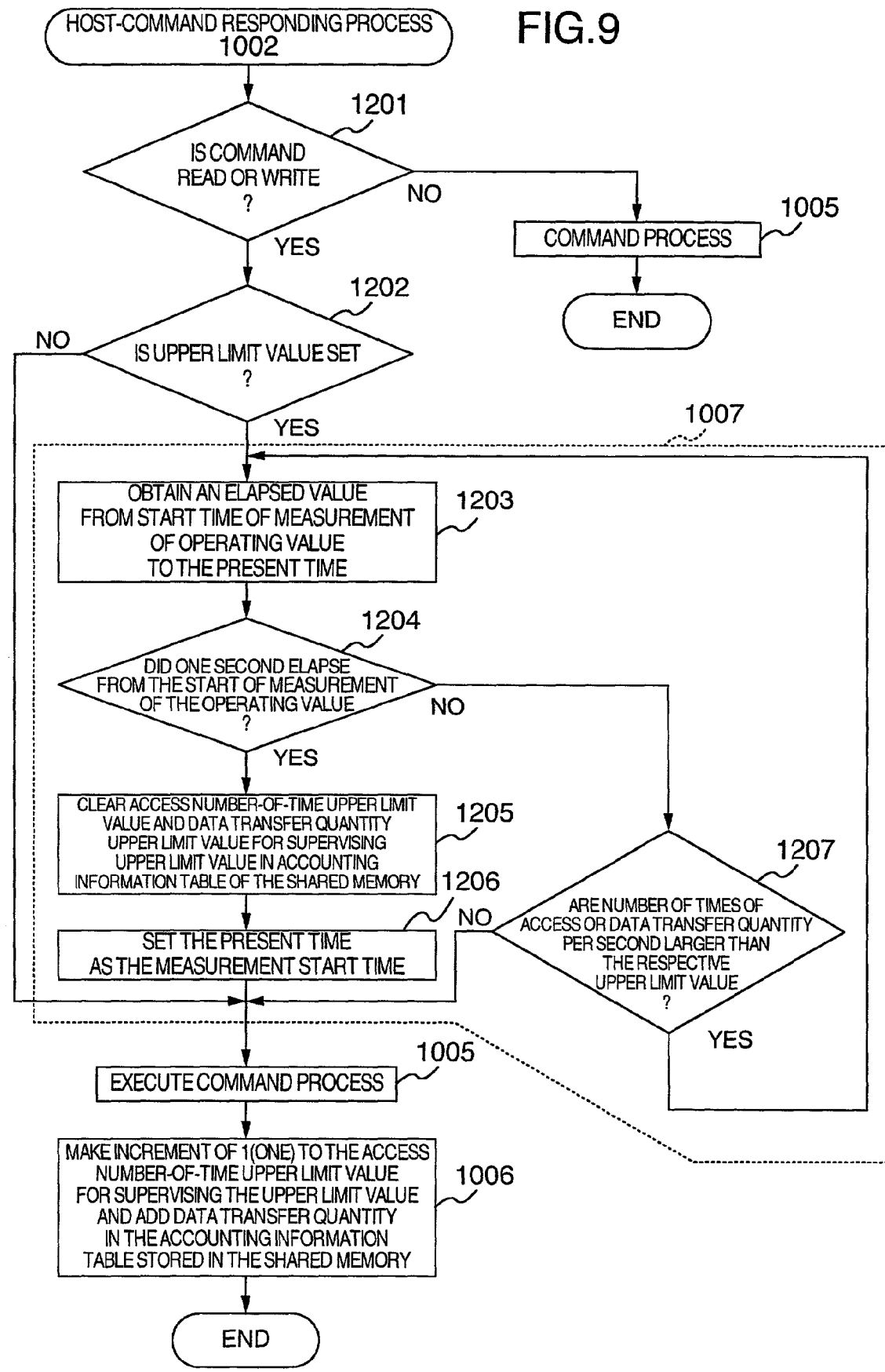
FIG. 9 is a flow chart of a host-command responding process of the I/O process control portion in response to a request issued by the host computers.

FIG. 9 is a flow chart of the host responding process (Step 1002) executed in the process distribution (Step 1001) when there is a request from any one of the host computers 101 to 104.

When the request from the host computer 101, 102, 103 or 104 is neither a READ process nor a WRITE process (Step 1201), a command process in response to the request is executed (Step 1005) and completed.

When the request from the host computer 101, 102, 103 or 104 is a READ process or a WRITE process, and neither the respective access number-of-time upper limit values nor the data transfer-quantity upper limit values are set in every host computer, in every WWN, in every channel port, in every storage device, and in every in-storage-device area (Step 1202), a command process in response to the request (Step 1005) is executed. Then, 1 (one) is added to the access number-of-time integrated value in corresponding one of the accounting information tables 606, 614, 622, 630 and 638 of the host computer, the WWN, the channel port, the storage device, and the in-storage-device area which has responded to the request respectively, all the table being stored in the shared memory 605, while a requested data transfer quantity is added to the data transfer-quantity integrated value in the corresponding one of the accounting information tables 606, 614, 622, 630 and 638. Thus, the process is completed (Step 1006).

In the case where the access number-of-time upper limit value 618 in the WWN accounting information table 614 stored in the shared memory 605 is set to any value other than zero, and the access number-of-time upper limit value to WWN 105 is set, if a READ or WRITE process is executed through the WWN 105 of the host computer 101 (Step 1201), the upper limit value supervising start time in the WWN accounting information table 614 is read and the elapsed time from the start time to the present time is calculated (Step 1203), because the access number-of-time upper limit value is set in the WWN 105. If the elapsed time is longer than one second (Step 1204), the access number-of-time upper limit value 619 for supervising the upper limit value in the WWN accounting information table 614 is cleared (Step 1205). Then, the present time is set as the upper limit value supervising start time 621 (Step 1206), the command process (Step 1005) in response to the request is executed, and 1 (one) is added to the access number-of-time upper limit value 619 for supervising the upper limit value.

If the measured time is shorter than one second and the access number-of-time upper limit value 619 for supervising the upper limit value is smaller than the access number-of-time upper limit value 618, the command in response to the request is executed (Step 1005) and 1 (one) is added to the access number-of-time upper limit value 619 for supervising the upper limit value.

If the measured time is shorter than one second (Step 1204) and the access number-of-time upper limit value 619 for supervising the upper limit value is not smaller than the access number-of-time upper limit value 618, the command process (Step 1005) is suppressed until one second or more elapsed. Accordingly, the request (the number-of-times of access per second) from the WWN 105 cannot exceed the access number-of-time upper limit value 618 (Step 1207).

Figure 10:
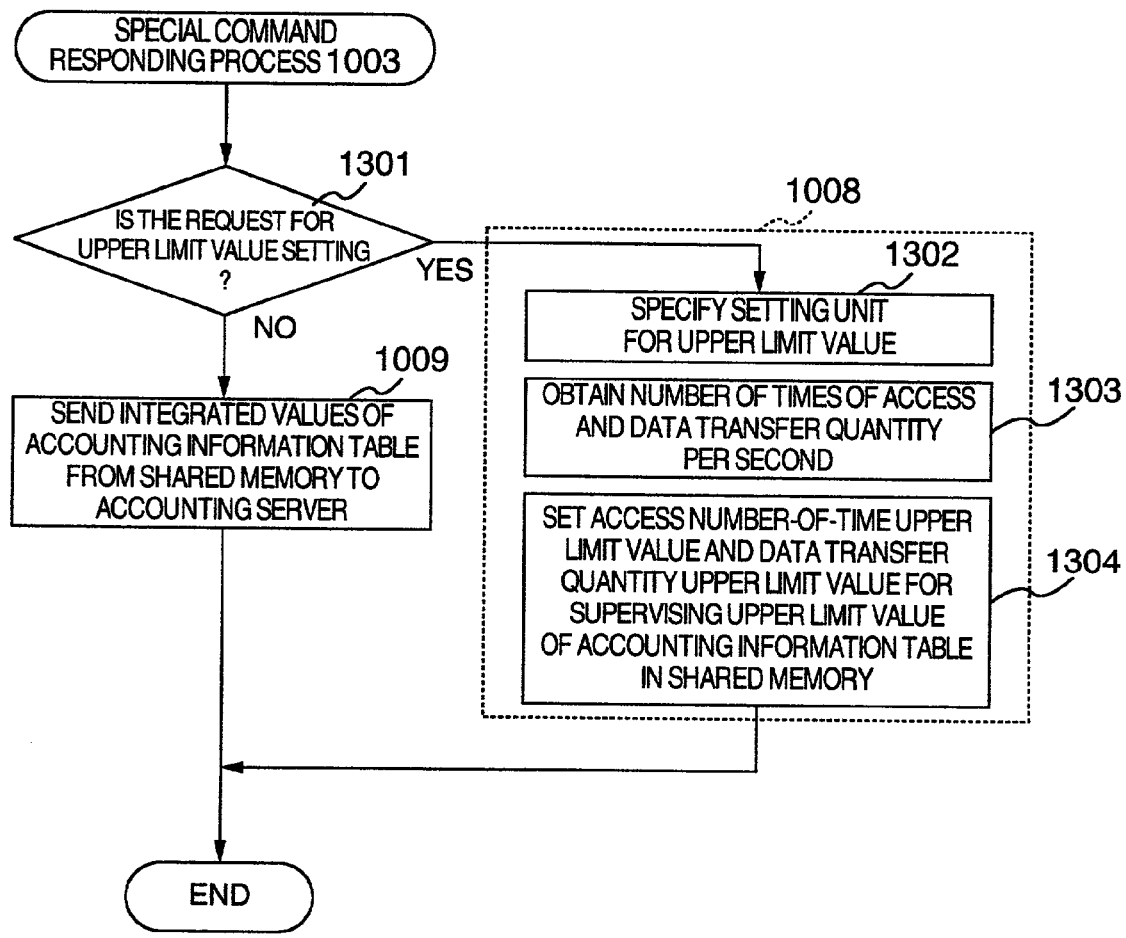
FIG. 10 is a flow chart of a special command responding process of the I/O process control portion in response to a request issued by an accounting server.
Figure 11:
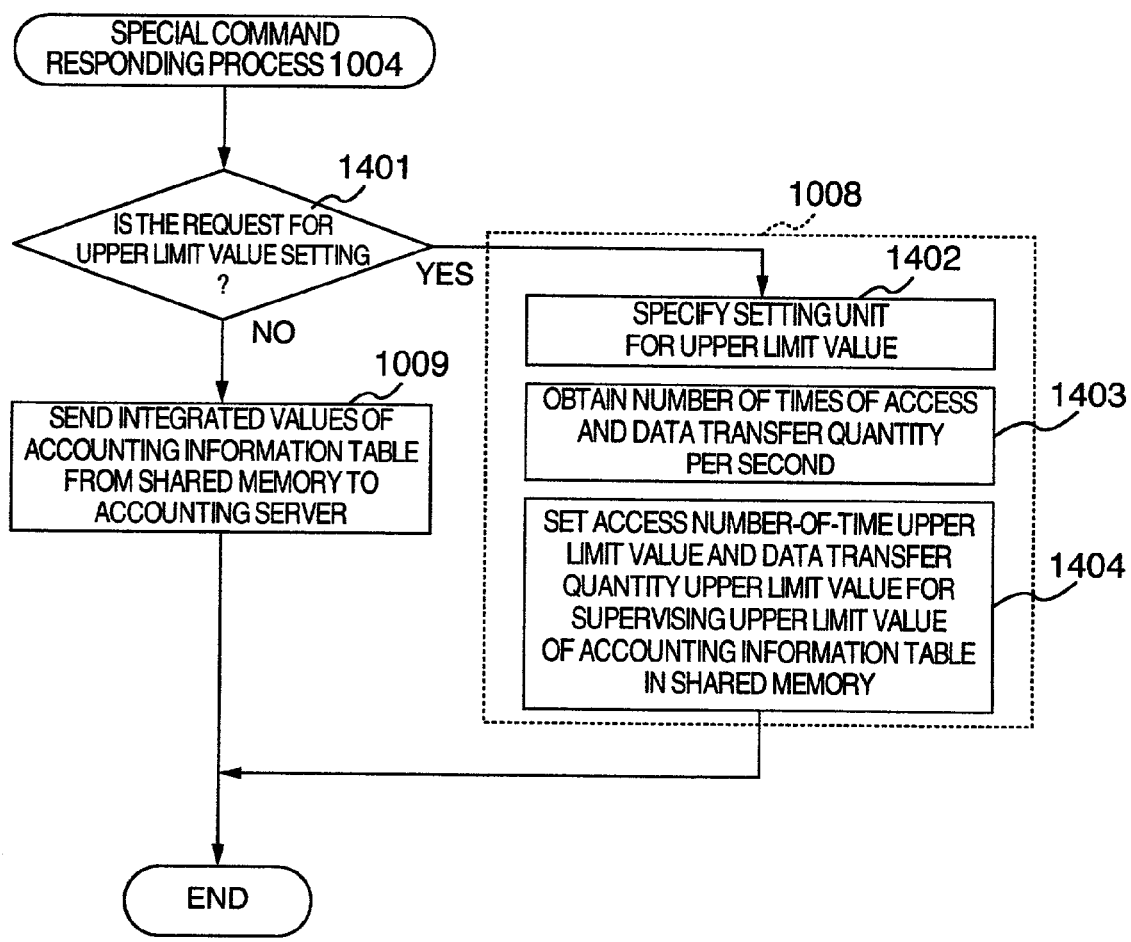
FIG. 11 is a flow chart of a service processor responding process of the I/O process control portion in response to a request issued by a service processor.

FIG. 10 is a flow chart of the special command responding process (Step 1003) for executing a process in response to the request from the accounting server 801. FIG. 11 is a flow chart of the service processor responding process (Step 1004) for executing a process in response to the request from the service processor 901.

In the flow chart of FIG. 10 or 11, if the request from the accounting server 801 or service processor 901 is not for setting of the upper limit value (Step 1301 or 1401), the access number-of-time integrated values and the data transfer-quantity integrated values in the accounting information tables 606, 614, 622, 630 and 638 respectively stored in the shared memory 605 are sent to the accounting server 801 or service processor 901.

Detailed description about the Step 1008 in FIG. 10 or 11 will be made later.

Figure 12:
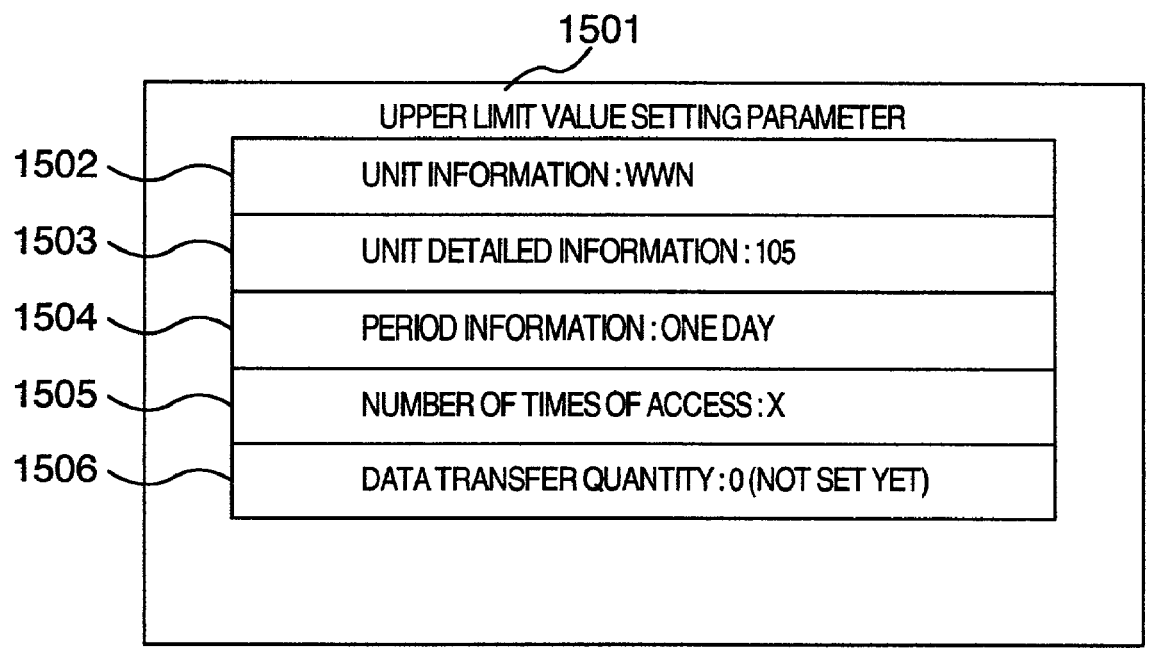
FIG. 12 is a table of an upper limit value setting parameter in upper limit value setting requested from the accounting server and the service processor.

FIG. 12 is a view showing an upper limit value setting parameter 1501 when there is an upper limit value setting request from the accounting server 801 or service processor 901. The upper limit value setting parameter 1501 is constituted by: a unit information 1502 for showing a unit such as a host computer, a WWN, a channel port, or the like; a unit detailed information 1503 for setting the details of the unit; a period information 1504 for setting one month, one hour, or one week; number of times of access 1505 which are allowed to be made in the period; and a data transfer quantity 1506 which is allowed to be made in the period.

The flow in FIG. 10 or 11 will be described in the case where there is an access number-of-time upper limit value setting request to the WWN 105 from the accounting server 801 or service processor 901.

When there is a request to set the upper limit value from the accounting server 801 or service processor 901 (Step 1301 or 1401), the WWN 105 is identified on the basis of the unit information 1502 and the unit detailed information 1503 in the upper limit value setting parameter 1501 (Step 1302 or 1402). An access number-of-time upper limit value in one second is obtained on the basis of the period information 1504 and the number of times of access 1505 in the upper limit value setting parameter 1501 (Step 1303 or 1403). Then, the obtained access number-of-time upper limit value is set as the access number-of-time upper limit value 617 in the WWN accounting information table 614 stored in the shared memory 605.

Next, (1) under the condition that no access number-of-time upper limit value is set for WWN 105, (2) under the condition that an access number-of-time upper limit value is set for the WWN 105 but there is no limit in the access to the WWN 105, and (3) under the condition that an access number-of-time upper limit value is set for the WWN 105 and there is a limit in the access to the WWN 105, description will be made respectively about the examples of the method how the accounting server 801 calculates the rate on the basis of the accounting data.

(1) Under the condition that no access number-of-time upper limit value is set for the WWN 105, the rate for the access number-of-time integrated value 615 which is the accounting data sent from the storage control device 401 will be calculated in a manner as follows.

$$\text{rate} = (\text{access number-of-time integrated value [number of times]} \times \text{one access rate [¥/number of times]}) + (\text{storage capacity [MByte]} \times \text{capacity unit price [¥/MByte]})$$

Thus, this rate is calculated on the basis of meter accounting of the number of times of the access. Further, if one access rate is set to 0 [¥/number of times], the rate will be a fixed amount because only the storage capacity is accounted.

(2) Under the condition that there is an access number-of-time upper limit value for the WWN 105 but there is no limit in the access to the WWN 105, the rate for the access number-of-time integrated value 615 which is the accounting data sent from the storage control device 401 will be calculated in a manner as follows.

In the case where the access number-of-time upper limit value is equal to or than the access number-of-time integrated value:

$$\text{rate} = (\text{access number-of-time upper limit value [number of times]} \times \text{one access rate [¥/number of times]}) + (\text{storage capacity [MByte]} \times \text{capacity unit price [¥/MByte]})$$

In the case where the access number-of-time upper limit value is smaller than the access number-of-time integrated value:

$$\text{rate} = (\text{access number-of-time upper limit value [number of times]} \times \text{one access rate [¥/number of times]}) + ((\text{access number-of-time integrated value [number of times]} - \text{access number-of-time upper limit value [number of times]}) \times \text{one access rate [¥/number of times] when the integrated value is larger than the upper limit value}) + (\text{storage capacity [MByte]} \times \text{capacity unit price [¥/MByte]})$$

This rate because a meters accounting in accordance with the number of times of access based on one access rate indicating over the upper limit value which is equal to or larger than one access rate.

(3) Under the condition that an access number-of-time upper limit value is set for the WWN 105 and there is a limit in the access to the WWN 105, because the number of times of access is limited to be not larger than the upper limit value, the rate will be calculated in a manner as follows.

$$\text{rate} = (\text{access number-of-time upper limit value [number of times]} \times \text{one access rate [¥/number of times]}) + (\text{storage capacity [MByte]} \times \text{capacity unit price [¥/MByte]})$$

Thus, this rate will be a fixed amount.

In such a manner, according to the embodiment, the number of times of access and the data transfer quantity for every host computer, every World Wide Name (WWN), every channel port, every storage device and every in-storage-device area are generated as accounting data in the storage control device. An accounting server can realize a meter accounting rate system in accordance with the accounting data generated in the storage control device.

Figure 13:
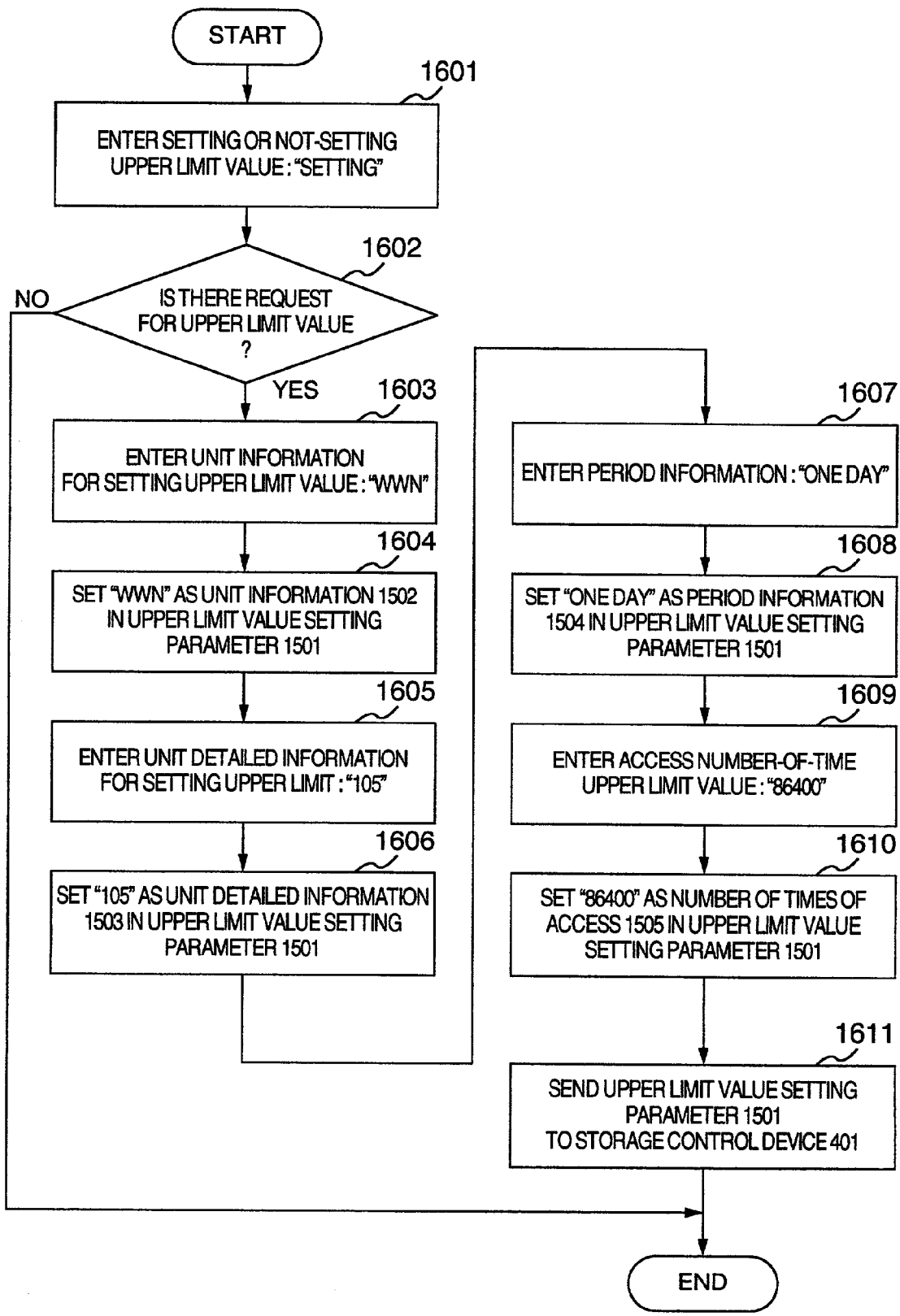
FIG. 13 is a flow chart in which the server accounting requests setting of upper limit values of a WWN as an accounting subject control unit.

Next, a specific example for setting the access number-of-time upper limit value for the WWN 105 from the accounting server 801 will be described with reference to the flow chart of FIG. 13 and FIG. 12. First, a user chooses setting or not-setting of an upper limit value request (Step 1601). If there is an upper limit value request (Step 1602), the user enters information of the unit as the subject for setting the upper limit value. Here, assume that the user chooses "WWN" as the unit information (Step 1603). Next, "WWN" is set as unit information 1502 of the upper limit value setting parameter 1501 (Step 1604). The user enters the number of the WWN "105" in unit detailed information for setting the upper limit value (Step 1605). Then, the number of the WWN "105" is set as the unit detailed information 1503 (Step 1606). Next, the user enters one day in period information (Step 1607) and "one day" is set as the period information 1504 (Step 1608). Next, the user enters "86400" in the access number-of-time upper limit value (Step 1609). Here, "86400" is set as the number of access times 1505 (Step 1610). The user then sends the thus set upper limit value setting parameter 1501 to the storage control device 401 (Step 1611). In such a manner, as a control unit, that is, as an accounting subject, the upper limit value for accounting is determined for a specified WWN. Although the above example has described about the process of setting an upper limit value requested from the accounting server 801, the same process will be executed if setting of an upper limit value is requested from the service processor 901.

Figure 14:
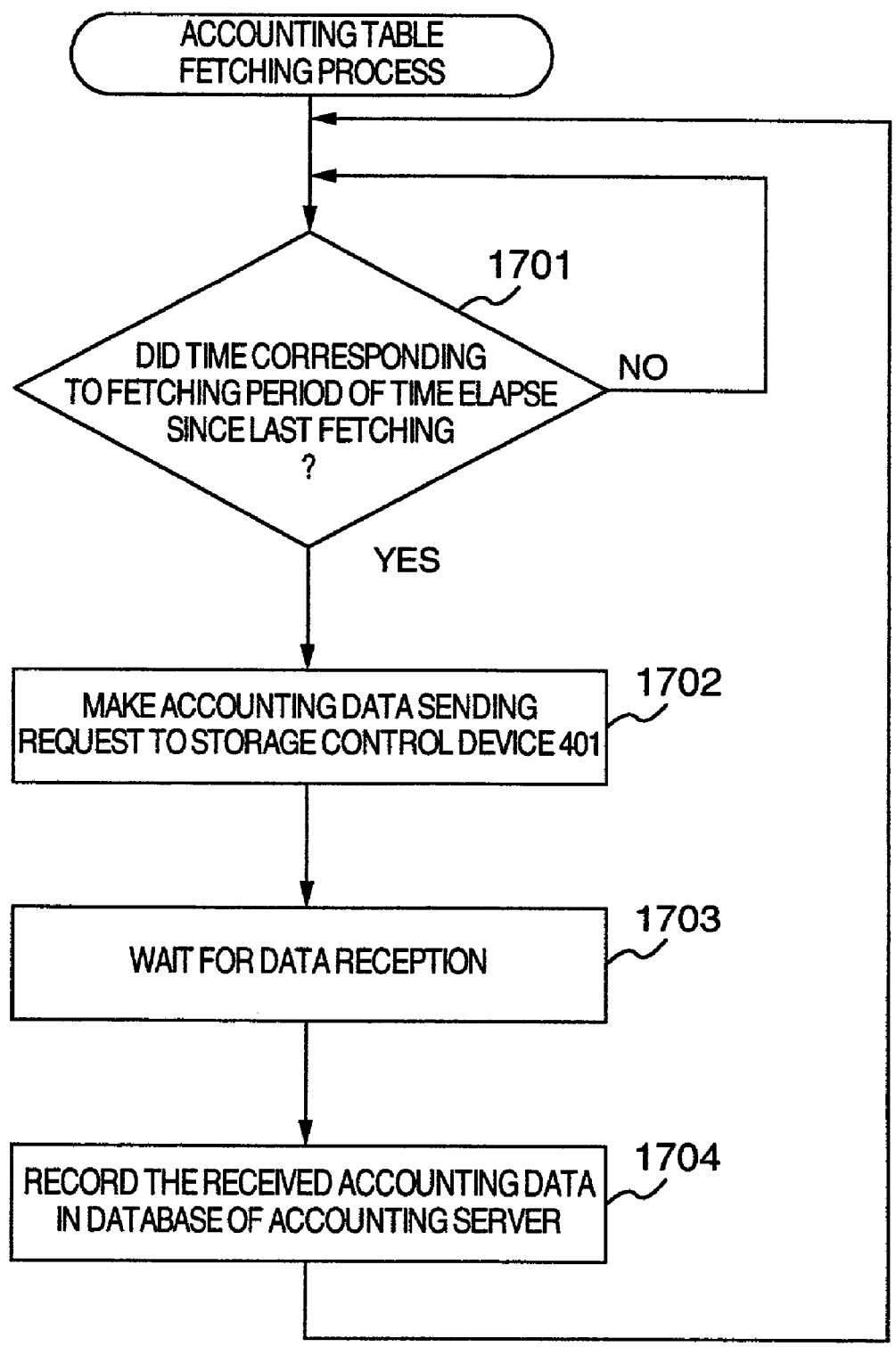
FIG. 14 is a flow chart in which the accounting server fetches accounting data from the storage control device.

Further, a specific example in which the accounting server 801 fetches the accounting data every predetermined period from the shared memory 605 of the storage control device 401 will be described in accordance with the flow chart of FIG. 14. First, a judgement is made as to whether a predetermined time after the fetching of the last accounting data elapsed or not (Step 1701). If the predetermined time elapsed, a request of sending accounting data is issued to the storage control device 401 (Step 1702). Waiting is made until the accounting data is received (Step 1703). The accounting server 801 records the received accounting data in a database of the accounting server 801 (Step 1704). Although the above example has described about the case where the accounting server 801 has requested the accounting data, the same process will be executed if the service processor 901 requests the accounting data from the storage control device 401.

Figure 15:
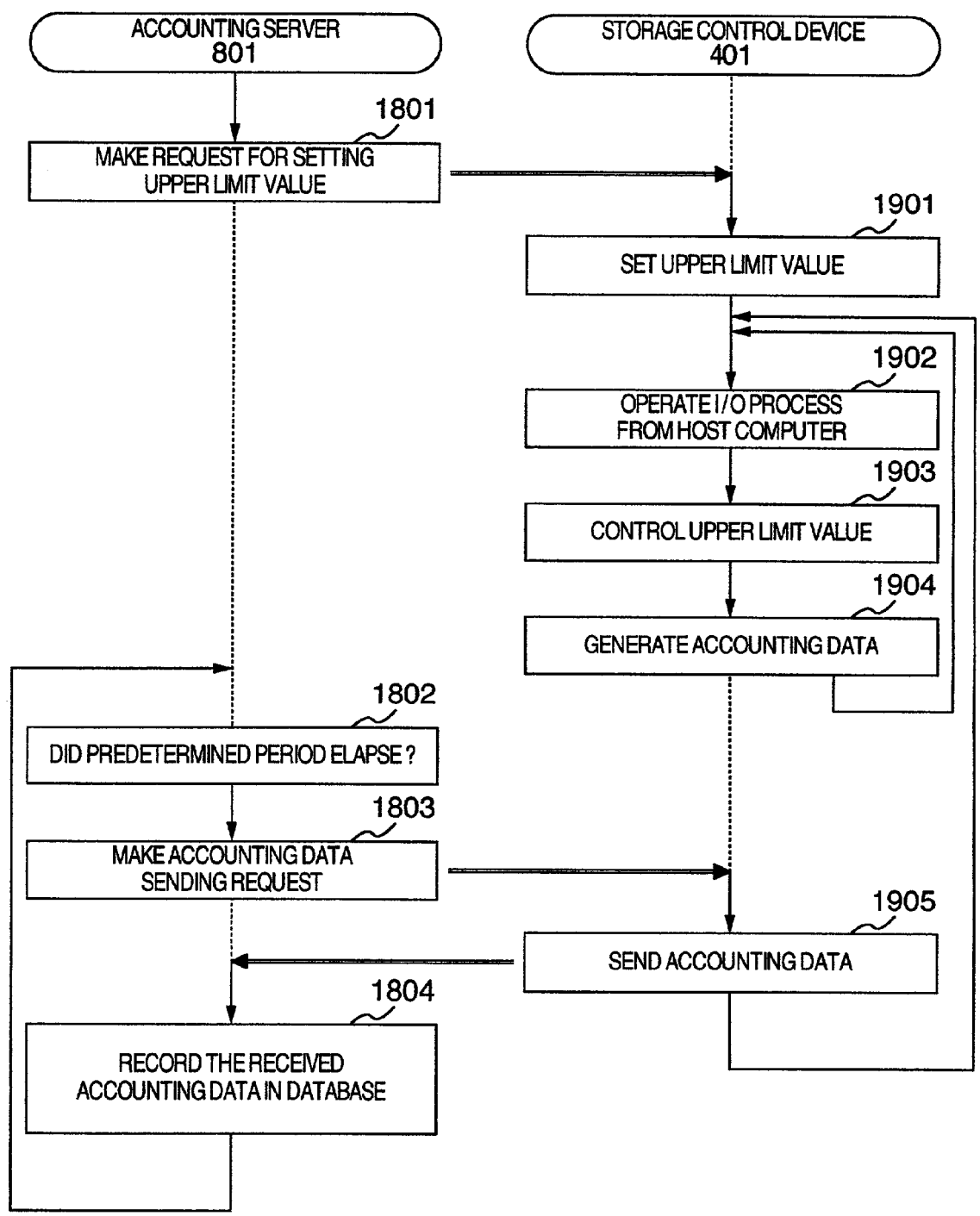
FIG. 15 is a flow chart showing the whole of the accounting system.

FIG. 15 is a flow chart from the step of the above-mentioned upper limit value setting request issued from the accounting server 801 to the storage control device 401 to the step of fetching the accounting data stored in the shared memory 605 of the storage control device 401 into the accounting server 801. The accounting server 801 makes an upper-limit value setting request to the storage control device 401 (Step 1801). After that, waiting is made for lapse of a predetermined time (Step 1802).

On the other hand, if the storage control device 401 receives the upper limit value setting request from the accounting server 801, the upper limit value setting is performed in associated one of the I/O process control portions 601 to 604 (Step 1901). Next, the associated one of the I/O process control portion 601 to 604 fetches accounting data from the associated one of the host computers 101 to 104 into the storage control device 401 (Step 1902). The I/O process is determined whether it is executed or restrained for the upper limit value set in Step 1901 (Step 1903), and accounting data is generated (Step 1904).

After a predetermined time elapsed, the accounting server 801 issues an accounting data sending request to the storage control device 401 (Step 1803). In response to the request, the storage control device 401 sends the accounting data to the accounting server 801 (Step 1905). After then, the accounting server 801 records the received accounting data in the database (Step 1804). Incidentally, the accounting data mentioned here means the contents of the accounting information tables shown in FIGS. 2 through 6. Further, as described in FIGS. 13 and 14, the same process shown in FIG. 15 will be executed if an upper limit value setting request is issued from the service processor 901 to the storage control device 401.

According to the present invention, it is therefore possible to make accounting in accordance with the number of times of access and the data transfer quantity of each user of a plurality of users to whom equal storage capacity is assigned, even though the number of times of access or data transfer quantity made by each user may be different.

What is claimed is:

1. An accounting system comprising:
a plurality of host computers;
an accounting server in data communication with said host computers;
a storage control device having a plurality of channel ports for receiving data input/output operations from said host computers, said storage control device in data communication with said accounting server;
storage devices operative with said storage control device to store data received from said host computers and to retrieve data for transmission to said host computers;
accounting data generating means for generating accounting data based on at least a number of times of access or a data transfer quantity for each of one or more accounting subject control units; and
transfer means for informing said accounting server of said accounting data generated by said accounting data generating means,
wherein for each said accounting subject control unit, accounting data is generated using metered accounting if an upper limit value for either the number of accesses per unit of time or for the quantity of data transferred per unit of time is not set,
wherein for each said accounting subject control unit, if said upper limit value is set, then accounting data is generated using fixed accounting when said upper limit value has not been exceeded,
wherein for each said accounting subject control unit, if said upper limit value is set and an access limit for the number of accesses is not set, then accounting data is generated using metered accounting when that upper limit value has been exceeded,
wherein for each said accounting subject control unit, if said upper limit value is set and said access limit is set, then accounting data is generated using fixed accounting.

2. An accounting system according to claim 1, wherein an accounting subject control units is one of a host computer, a World Wide Name, a channel port, a storage device, or an in-storage-device area.

3. An accounting system according to claim 1, wherein said storage control device is associated with a service processor and includes transfer means for informing said service processor of said accounting data.

4. An accounting system according to claim 3, further comprising:
means for setting said upper limit value of said accounting data in said accounting subject control units, said means being made to operate from at least one of said accounting server or said service processor.

5. An accounting system according to claim 4, wherein said upper limit value is determined on the basis of a predetermined period which includes, as a unit, at least one of a day, a week, a month, or a year.

6. An accounting system according to claim 4, wherein said storage control device includes means which operates so that when said upper limit value is set, said means does not process said data input/output request when said upper limit value has been exceeded.

7. An accounting system according to claim 4, wherein at least one of said accounting server and said service processor has means for fetching said accounting data of said storage control device every predetermined period, and means for calculating rates on the basis of said accounting data fetched by said fetching means and for performing rate management.

8. An accounting system according to claim 4, wherein said storage control device has I/O control portions for setting at least said upper limit values and generating accounting data in accordance with said upper limit values, and a shared memory for storing said accounting data.

9. An accounting system according to claim 1, wherein a connection between said storage control device and said host computers is made through serial channels of optical fibers so as to constitute a LAN.

10. The method of claim 1 wherein said upper limit value is for the number of accesses per unit of time or for the quantity of data transferred per unit of time of every connected server.

11. The method of claim 1 wherein said upper limit value is for the number of accesses per unit of time or for the quantity of data transferred per unit of time of every connected world wide name.

12. The method of claim 1 wherein said upper limit value is for the number of accesses per unit of time or for the quantity of data transferred per unit of time of every connected channel port.

13. The method of claim 1 wherein said upper limit value is for the number of accesses per unit of time or for the quantity of data transferred per unit of time of every connected storage device.

14. The method of claim 1 wherein said upper limit value is for the number of accesses per unit of time or for the quantity of data transferred per unit of time of every connected in-storage-device area.

15. An accounting method for making accounting for operation of a plurality of host computers in a storage-related accounting system which comprises said plurality of host computers, an accounting server, a storage control device connected at least to said plurality of host computers and to said accounting server for performing data input/output operation through channel ports, and a storage device for storing data processed by said storage control device, said accounting method comprising steps of:
(a) designating accounting subject control units;
(b) for at least some of said accounting subject control units, determining an upper limit value for a number of times of access per unit of time and for an upper limit value for a data transfer quantity per unit of time, wherein access and data transfer occur for each of said accounting subject control units;
(c) generating accounting data of said accounting subject control units in accordance with said upper limit values; and
(d) recording said accounting data,
wherein for each said accounting subject control unit, accounting data is generated using metered accounting if an upper limit value for either the number of accesses per unit of time or for the quantity of data transferred per unit of time is not set,
wherein for each said accounting subject control unit, if said upper limit value is set, then accounting data is generated using fixed accounting when said upper limit value has not been exceeded,
wherein for each said accounting subject control unit, if said upper limit value is set and an access limit for the number of accesses is not set, then accounting data is generated using metered accounting when that upper limit value has been exceeded,
wherein for each said accounting subject control unit, if said upper limit value is set and said access limit is set, then accounting data is generated using fixed accounting.

16. An accounting method according to claim 15, wherein each said accounting subject control units is a host computers, a World Wide Names, a channel ports, or a storage areas in a storage devices.

17. An accounting method according to claim 15, wherein said accounting server is associated with a service processor for controlling and supervising said storage control device.

18. An accounting method according to claim 15, wherein, in said step (b), said accounting server makes an upper limit values setting request to said storage control device, and in response to said request, said storage control device determines said upper limit values for said number of times of access and said data transfer quantities.

19. An accounting method according to claim 15, wherein said generation of said accounting data stated in said step (c) is made by said storage control device in accordance with said upper limit values.

20. An accounting method according to claim 15, wherein, in said step (d), said accounting server makes an accounting data sending request to said storage control device in every predetermined period, and receives said accounting data in said every predetermined period to record said accounting data in a database of said accounting server.

21. The method of claim 15 wherein said upper limit value is for the number of accesses per unit of time or for the quantity of data transferred per unit of time of every connected server.

22. The method of claim 15 wherein said upper limit value is for the number of accesses per unit of time or for the quantity of data transferred per unit of time of every connected world wide name.

23. The method of claim 15 wherein said upper limit value is for the number of accesses per unit of time or for the quantity of data transferred per unit of time of every connected channel port.

24. The method of claim 15 wherein said upper limit value is for the number of accesses per unit of time or for the quantity of data transferred per unit of time of every connected storage device.

25. The method of claim 15 wherein said upper limit value is for the number of accesses per unit of time or for the quantity of data transferred per unit of time of every connected in-storage-device area.

* * * * *